United States Patent
Kawano et al.

(10) Patent No.: US 9,912,237 B2
(45) Date of Patent: Mar. 6, 2018

(54) SWITCHING REGULATOR

(71) Applicant: SII Semiconductor Corporation, Chiba-shi, Chiba (JP)

(72) Inventors: Akihiro Kawano, Chiba (JP); Katsuya Goto, Chiba (JP)

(73) Assignee: SII SEMICONDUCTOR CORPORATION, Chiba (JP)

( * ) Notice: Subject to any disclaimer, the term of this patent is extended or adjusted under 35 U.S.C. 154(b) by 0 days.

(21) Appl. No.: 15/434,334

(22) Filed: Feb. 16, 2017

(65) Prior Publication Data
US 2017/0244320 A1 Aug. 24, 2017

(30) Foreign Application Priority Data
Feb. 23, 2016 (JP) .................................. 2016-032102

(51) Int. Cl.
G05F 1/00 (2006.01)
H02M 3/157 (2006.01)

(52) U.S. Cl.
CPC .................................. H02M 3/157 (2013.01)

(58) Field of Classification Search
CPC ............................... H02M 3/156; H02M 3/157
USPC ........................................ 323/282–285, 288
See application file for complete search history.

(56) References Cited

U.S. PATENT DOCUMENTS

| | | | |
|---|---|---|---|
| 8,476,887 B2 | 7/2013 | Tateishi et al. | |
| 9,625,932 B2* | 4/2017 | Qu | G05F 3/02 |
| 2004/0080963 A1* | 4/2004 | Grant | H02M 3/1588 363/59 |
| 2007/0273341 A1* | 11/2007 | Shimizu | H02M 1/36 323/224 |
| 2008/0088284 A1* | 4/2008 | Weng | H02M 3/1563 323/271 |
| 2009/0140708 A1* | 6/2009 | Tateishi | H02M 3/1588 323/282 |
| 2011/0025282 A1* | 2/2011 | Amighini | H02H 5/10 323/282 |
| 2014/0062434 A1* | 3/2014 | Ouyang | H02M 3/156 323/284 |
| 2014/0062449 A1* | 3/2014 | Qu | G05F 3/02 323/311 |
| 2015/0180335 A1* | 6/2015 | Takada | H02M 3/156 323/288 |
| 2016/0156264 A1* | 6/2016 | Masuko | H02M 3/156 323/217 |

* cited by examiner

Primary Examiner — Alex Torres-Rivera
(74) Attorney, Agent, or Firm — Brinks Gilson & Lione

(57) ABSTRACT

To provide a COT-controlled switching regulator capable of preventing an output voltage from excessively exceeding a desired voltage even though a light load is connected to an output terminal. A switching regulator of the present invention is configured to be equipped with a 100% DUTY detection circuit which detects a 100% DUTY at which a high-side switching element continues an on state for a prescribed time or more and outputs a detected signal to an output control circuit and to cause the output control circuit to turn off the high-side switching element when the output control circuit receives the detected signal therein.

5 Claims, 4 Drawing Sheets

SWITCHING REGULATOR

RELATED APPLICATIONS

This application claims priority under 35 U.S.C. § 119 to Japanese Patent Application No. 2016-032102 filed on Feb. 23, 2016, the entire content of which is hereby incorporated by reference.

BACKGROUND OF THE INVENTION

Technical Field

The present invention relates to a switching regulator which outputs a desired voltage from an output terminal.

Background Art

FIG. 6 is a circuit diagram illustrating a related art switching regulator.

When the voltage of an output terminal 6 becomes lower than a prescribed voltage, and a feedback voltage VFB is lowered more than a reference voltage VREF, an error comparator 610 outputs an H signal. When the H signal is inputted to an input terminal S, an R-S flip-flop circuit 609 outputs the H signal from an output terminal Q. An output control circuit 615 turns on a PMOS transistor 602 and turns off an NMOS transistor 604 through drivers 607 and 608 respectively. In that state, the H signal is outputted from a node N1 to raise the voltage of the output terminal 6 through an inductor 603 and an output capacitor 605.

On the other hand, after the H signal of the node N1 is inputted and a prescribed time has elapsed, an on-time control circuit 620 outputs the H signal to an input terminal R of the R-S flip-flop circuit 609. Then, the R-S flip-flop circuit 609 turns off the PMOS transistor 602 through the driver 607.

A minimum off-time generation circuit 611 monitors the input signal of the driver 607 and outputs a signal based on the state of the input signal to the output control circuit 615. That is, with the turned-off of the PMOS transistor 602 as a trigger, the minimum off-time generation circuit 611 controls an off-time of the PMOS transistor 602 to be a constant time or more.

Since the signal turning on the PMOS transistor 602 for the fixed time is outputted when the feedback voltage VFB falls below the reference voltage VREF, this control is called COT (Constant On Time) control (refer to, for example, Patent Document 1).

[Patent Document 1]
U.S. Pat. No. 8,476,887 Specification

SUMMARY OF THE INVENTION

FIG. 7 is a timing chart illustrating a relation between a power supply voltage Vin and an output voltage Vout at a light load of the related art switching regulator.

Even when the power supply voltage Vin is lowered and the output voltage Vout becomes a prescribed voltage or less, both voltages fall down while maintaining the relation of Vin>Vout (before T1).

However, in a state in which a load connected to the output terminal 6 is a light load, a decreasing speed of the power supply voltage Vin exceeds a decreasing speed of the output voltage Vout to reach Vin<Vout (after T1). Since the on-time control circuit 620 needs to take in a voltage value higher than the power supply voltage Vin when this state is reached, the on-time control circuit 620 is brought into a state of being not capable of outputting a reset signal, so that the PMOS transistor 602 continues an on state. When the PMOS transistor 602 continues the on state, the minimum off-time generation circuit 611 is not capable of exhibiting its function.

There is a danger that when the power supply voltage Vin is raised in the state in which such a PMOS transistor 602 continues to be turned on, its feedback function does not work and the output voltage Vout is raised with the rise in the power supply voltage Vin, so that the load connected to the output terminal 6 is broken by an excessive voltage.

The present invention has been made in view of the above problems and provides a switching regulator which does not generate an excessive output voltage Vout even when a load connected to an output terminal is turned into a light load.

In order to solve the related art problems, a switching regulator of the present invention is configured as follows.

The switching regulator is configured to be equipped with an on-time control circuit which monitors an output signal of a high-side switching element to output a signal controlling an on-time of the high-side switching element, a flip-flop circuit which generates a signal based on a signal of an error comparator and the signal of the on-time control circuit, an output control circuit which generates a control signal, based on the signal outputted from the flip-flop circuit, and a 100% DUTY detection circuit which detects a 100% DUTY at which the high-side switching element continues an on state for a prescribed time or more and outputs a detected signal to the output control circuit, and to cause the output control circuit to output a control signal turning off the high-side switching element when the output control circuit receives the detected signal therein.

According to a COT-controlled switching regulator of the present invention, the switching regulator controls a high-side switching element to be prevented from being kept on even though a load connected to an output terminal becomes a light load. Thus, it is possible to prevent an output voltage from exceeding a desired voltage.

DETAILED DESCRIPTION OF THE PREFERRED EMBODIMENTS

A preferred embodiment of the present invention will hereinafter be described with reference to the accompanying drawings.

Figure 1:
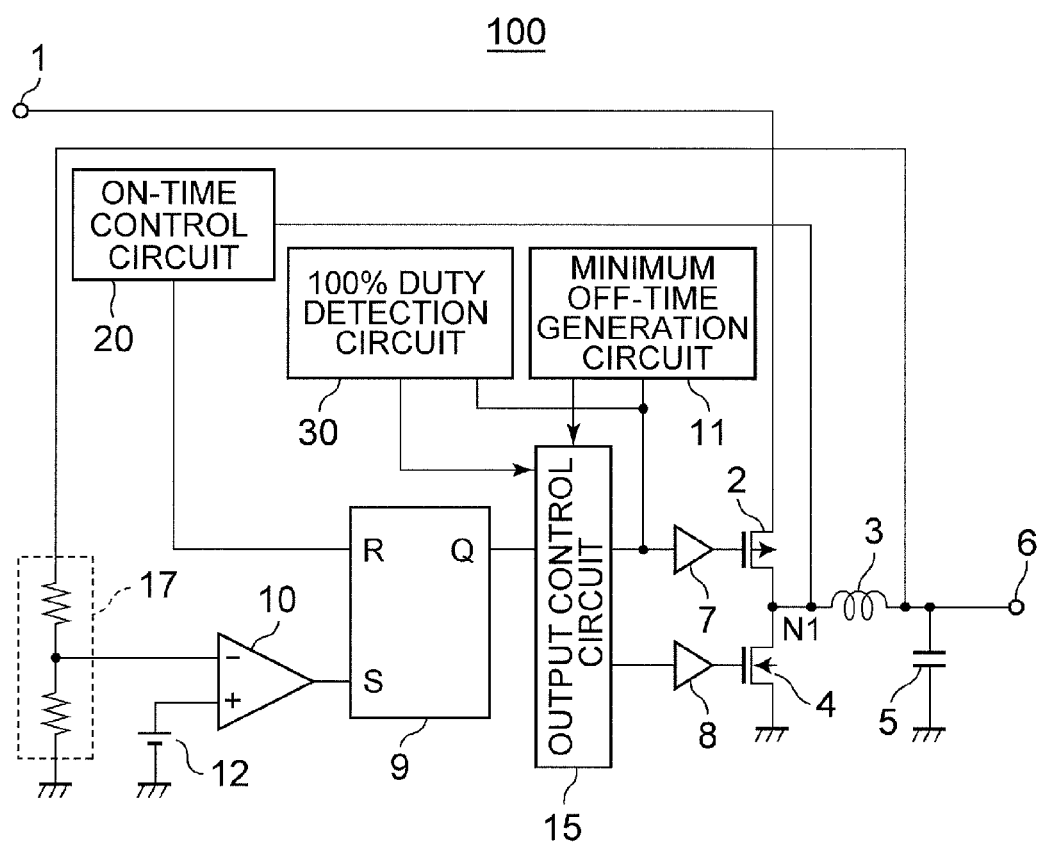
FIG. 1 is a circuit diagram illustrating the configuration of a switching regulator according to the present embodiment.

FIG. 1 is a circuit diagram of a switching regulator according to the present embodiment.

The switching regulator 100 according to the present embodiment is equipped with a feedback resistor 17, a reference voltage circuit 12, an error comparator 10, an R-S flip-flop circuit 9, an output control circuit 15, drivers 7 and 8, a PMOS transistor 2 which is a high-side switching element, an NMOS transistor 4 which is a low-side switching element, an on-time control circuit 20, a minimum off-time generation circuit 11, a 100% DUTY detection circuit 30, an inductor 3, and an output capacitor 5.

The feedback resistor 17 divides an output voltage Vout outputted from an output terminal 6 to generate a feedback voltage VFB. The reference voltage circuit 12 generates a reference voltage VREF. The error comparator 10 compares the feedback voltage VFB inputted to an inversion input terminal thereof and the reference voltage VREF inputted to a non-inversion input terminal thereof and outputs a signal based on the comparison result. The R-S flip-flop circuit 9 outputs an output signal to an output terminal Q thereof, based on the signal of the error comparator 10, which is inputted to an input terminal S thereof and a signal of the on-time control circuit 20, which is inputted to an input terminal R thereof. The output control circuit 15 outputs an output signal to each of the drivers 7 and 8, based on the output signal of the R-S flip-flop circuit 9. The driver 7 outputs a signal based on the output signal of the output control circuit 15 to a gate of the PMOS transistor 2 to control on/off of the PMOS transistor 2. The driver 8 outputs a signal based on the output signal of the output control circuit 15 to a gate of the NMOS transistor 4 to control on/off of the NMOS transistor 4. The on-time control circuit 20 monitors an H/L signal of a node N1 and outputs a signal based on a state thereof to the input terminal R of the R-S flip-flop circuit 9. The minimum off-time generation circuit 11 monitors the input signal of the driver 7 and outputs a signal based on a state thereof to the output control circuit 15. The 100% Duty detection circuit 30 monitors the input signal of the driver 7 and outputs a signal based on a state thereof to the output control circuit 15.

The PMOS transistor 2 has a source connected to an input terminal 1 supplied with a power supply voltage Vin, a drain connected to a drain of the NMOS transistor 4, and a gate connected to an output of the driver 7. When the PMOS transistor 2 is brought into an on state by the output signal of the driver 7, the PMOS transistor 2 transmits an H signal to be the power supply voltage Vin to the node N1. The NMOS transistor 4 has a source connected to a ground terminal, a drain connected to the drain of the PMOS transistor 2, and a gate connected to an output of the driver 8. When the NMOS transistor 4 is brought into an on state by the output signal of the driver 8, the NMOS transistor 4 transmits an L signal to be a ground potential to the node N1. The inductor 3 has one terminal connected to the node N1 and the other terminal connected to the output terminal 6 and one terminal of the output capacitor 5. The output capacitor 5 has the other terminal connected to the ground terminal.

Such a switching regulator 100 as described above is operated as follows to output the prescribed output voltage Vout from the power supply voltage Vin through the output terminal 6.

When the output voltage Vout outputted from the output terminal 6 becomes lower than a prescribed voltage, the feedback voltage VFB is lowered. The error comparator 10 compares the feedback voltage VFB and the reference voltage VREF. When the feedback voltage VFB becomes lower than the reference voltage VREF, the error comparator 10 outputs the H signal to the input terminal S of the R-S flip-flop circuit 9.

When the H signal is inputted to the input terminal S, the R-S flip-flop circuit 9 outputs the H signal from the output terminal Q to the output control circuit 15. When the H signal is inputted, the output control circuit 15 inputted with the output signal of the R-S flip-flop circuit 9 outputs the L signal to each of the drivers 7 and 8. On the other hand, when the L signal is inputted to the output control circuit 15, the output control circuit 15 outputs the H signal. The drivers 7 and 8 each inputted with the L signal from the output control circuit 15 output the L signal to the gates of the PMOS transistor 2 and the NMOS transistor 4 respectively.

When the L signal is inputted to the gate of the PMOS transistor 2, the PMOS transistor 2 is brought into an on state. When the L signal is inputted to the gate of the NMOS transistor 4, the NMOS transistor 4 is brought into an off state. As a result, the H signal is outputted to the node N1. The H signal is smoothed by a smoothing circuit comprised of the inductor 3 and the output capacitor 5 to raise the output voltage Vout of the output terminal 6, which is made lower than the prescribed voltage. When the output voltage Vout becomes higher than the prescribed voltage, a feedback mechanism opposite to the above reduces the output voltage Vout.

On the other hand, the H signal of the node N1 when the output voltage Vout becomes lower than the prescribed voltage is transmitted even to the on-time control circuit 20. The on-time control circuit 20 outputs the H signal after a prescribed time at which the H signal is inputted. When the H signal from the on-time control circuit 20 is inputted to the input terminal R, the R-S flip-flop circuit 9 outputs the L signal from the output terminal Q thereof. When the L signal is inputted from the R-S flip-flop circuit 9, the output control circuit 15 outputs the H signal to each of the drivers 7 and 8. When the driver 7 receives the H signal outputted from the output control circuit 15, the driver 7 outputs the H signal to turn off the PMOS transistor 2, and the driver 8 outputs the H signal to turn on the NMOS transistor 4. At this time, the L signal is outputted to the node N1. The time taken until the signal of the node N1 changes from H to L becomes an on-time taken to turn on the PMOS transistor 2. When the L signal is outputted to the node N1, the voltage outputted from the output terminal 6 begins to step down.

Thus, the oscillation signal of H/L is outputted to the node N1 at a Duty ratio corresponding to the output voltage Vout. The switching regulator 100 outputs a desired output voltage Vout. Assuming here that the output voltage is Vout, the voltage inputted from the input terminal is Vin, the on-time of the PMOS transistor 2 is Ton, and the cycle of the oscillation signal is Tcycle, an equation 1 is established.

$$Vout/Vin = Ton/Tcycle \quad (1)$$

Figure 2:
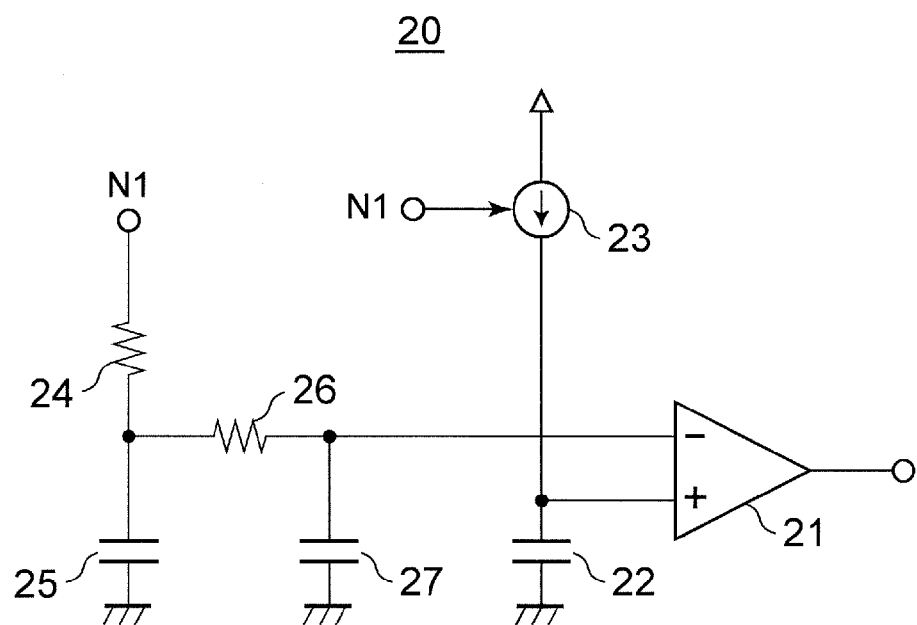
FIG. 2 is a circuit diagram illustrating one example of an on-time control circuit according to the present embodiment.

FIG. 2 is a circuit diagram illustrating one example of the on-time control circuit 20. An oscillation signal inputted from a node N1 to the on-time control circuit 20 is smoothed by a filter circuit comprised of resistors 24 and 26, and capacitors 25 and 27. That is, the oscillation signal is converted into a constant voltage equal to an output voltage Vout, which in turn is inputted to an inversion input terminal of a comparator 21. On the other hand, the voltage of a capacitor 22 charged by a constant current source 23 is inputted to a non-inversion input terminal of the comparator 21.

The constant current source 23 starts up by the H signal inputted from the node N1. Further, the constant current source 23 outputs a current proportional to the magnitude of a power supply voltage Vin. Therefore, the time taken to charge the capacitor 22 is inversely proportional to the power supply voltage Vin.

When the voltage of the capacitor 22 exceeds the voltage of the inversion input terminal, the comparator 21 outputs the H signal from an output terminal. Assuming that, since the voltage of the inversion input terminal is equal to the output voltage Vout, the electrostatic capacitance value of the capacitor 22 is C, and the current of the constant current source 23 is I, the relation of an equation 2 is established.

$$C \times Vout = I \times Ton \quad (2)$$

An equation 3 is yielded from the equation 1 and the equation 2. In the switching regulator using the COT control, the cycle Tcycle of the oscillation signal of the node N1 becomes a value which does not depend on the power supply voltage Vin and the output voltage Vout. An oscillation frequency determined by the cycle of the oscillation signal also becomes similarly a constant value which does not depend on the power supply voltage Vin and the output voltage Vout.

$$Tcycle \propto C \quad (3)$$

Now, when the power supply voltage Vin drops and gets close to the output voltage Vout, the on-time Ton becomes the same value as that of the cycle Tcycle of the oscillation signal. That is, the Duty ratio of the oscillation signal becomes 100%, so that the PMOS transistor 2 continues to turn on and the power supply voltage Vin is supplied to the output terminal 6 as it is.

Figure 3:
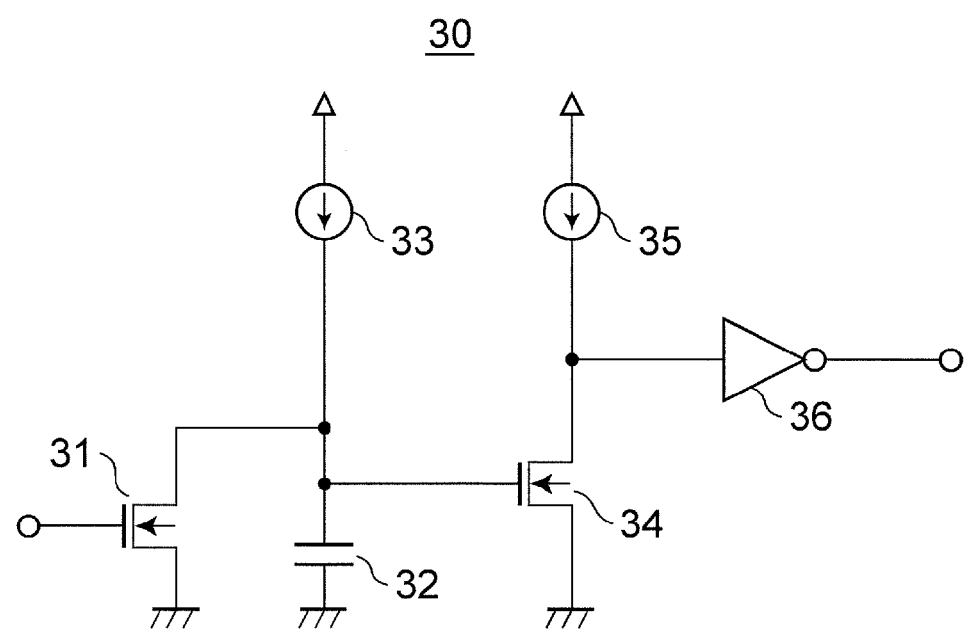
FIG. 3 is a circuit diagram illustrating one example of a 100% DUTY detection circuit according to the present embodiment.

FIG. 3 is a circuit diagram illustrating one example of the 100% DUTY detection circuit 30.

The 100% DUTY detection circuit 30 takes the voltage of the input terminal of the driver 7 as an input signal.

When the input signal at the normal operation is being inputted, a capacitor 32 repeats charging and discharging and the voltage thereof does not exceed a threshold voltage of an NMOS transistor 34.

When the PMOS transistor 2 is turned on, the driver 7 is inputted with an L signal at its input terminal. When the L signal is inputted to the 100% DUTY detection circuit 30, an NMOS transistor 31 is turned off. When the NMOS transistor 31 is turned off, the capacitor 32 is charged with a current of a current source 33. Then, when the PMOS transistor 2 is brought into a 100% DUTY state in which it continues to turn on, the capacitor 32 is not discharged so that the voltage thereof exceeds the threshold voltage of the NMOS transistor 34.

Thus, an inverter 36 outputs an L signal where the voltage of the capacitor 32 is not greater than the threshold voltage of the NMOS transistor 34. When the voltage of the capacitor 32 exceeds the threshold voltage of the NMOS transistor 34, the inverter 36 outputs an H signal.

As described above, when the 100% DUTY detection circuit 30 detects a 100% DUTY from the input terminal of the driver 7, the 100% DUTY detection circuit 30 outputs the H signal to the output control circuit 15. Then, the output control circuit 15 outputs the H signal to the driver 7 to switch the PMOS transistor 2 from the on state to the off state.

Figure 4:
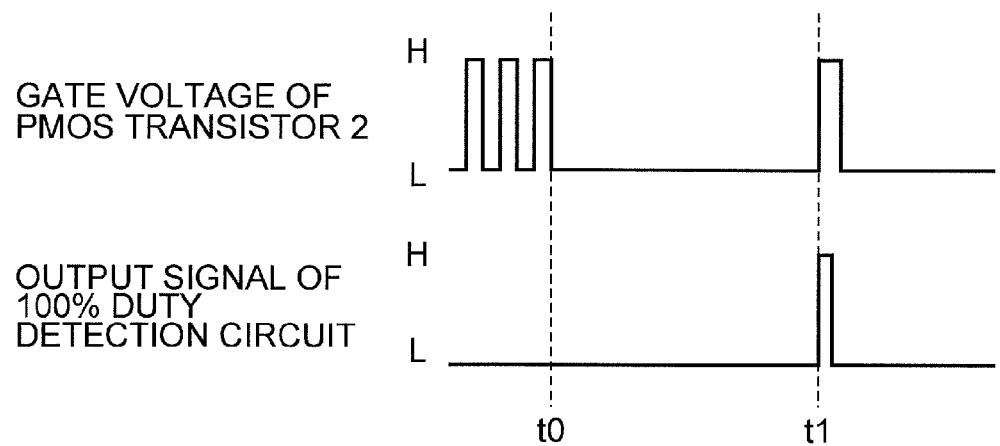
FIG. 4 is a timing chart illustrating the operation of the 100% DUTY detection circuit according to the present embodiment.

FIG. 4 is a timing chart illustrating the operation of the 100% DUTY detection circuit 30.

When the PMOS transistor 2 continues to turn on after a time t0, the 100% DUTY detection circuit 30 detects a 100% DUTY state at a time t1 after a prescribed time and outputs a detected signal. In response to the detected signal outputted from the 100% DUTY detection circuit 30, the output control circuit 15 outputs an H signal to the driver 7 to bring the PMOS transistor 2 into an off state. Then, in response to the H signal of the input terminal of the driver 7, the 100% DUTY detection circuit 30 outputs an L signal since the NMOS transistor 31 is turned on to discharge the capacitor 32.

As described above, the switching regulator equipped with the 100% DUTY detection circuit 30 according to the present embodiment is capable of controlling the PMOS transistor 2 to the off state even when the DUTY is 100%. Further, since the off-time of the PMOS transistor 2 is ensured by the minimum off-time generation circuit 11 if the PMOS transistor 2 is brought into the off state, the output voltage Vout can follow up a drop in the power supply voltage Vin.

Figure 5:
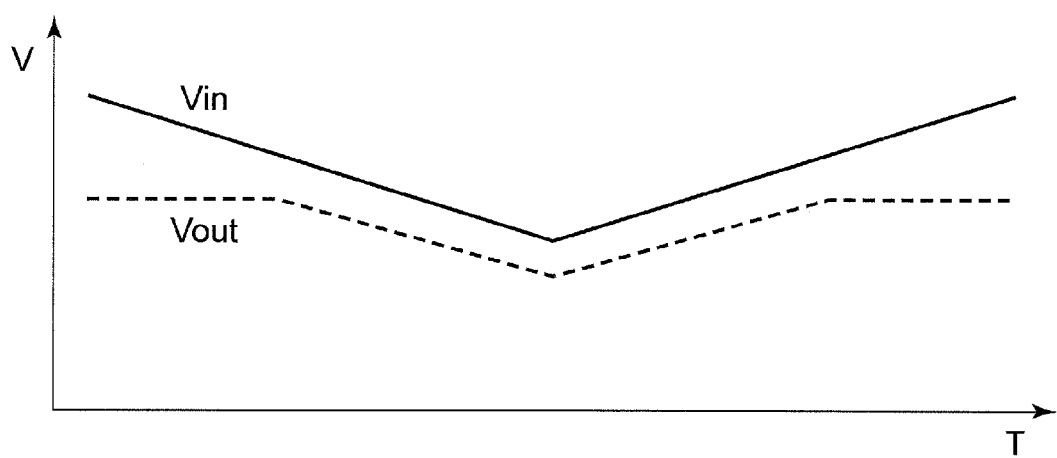
FIG. 5 is a timing chart illustrating a relation between a power supply voltage and an output voltage at a light load of the switching regulator according to the present embodiment.
Figure 6:
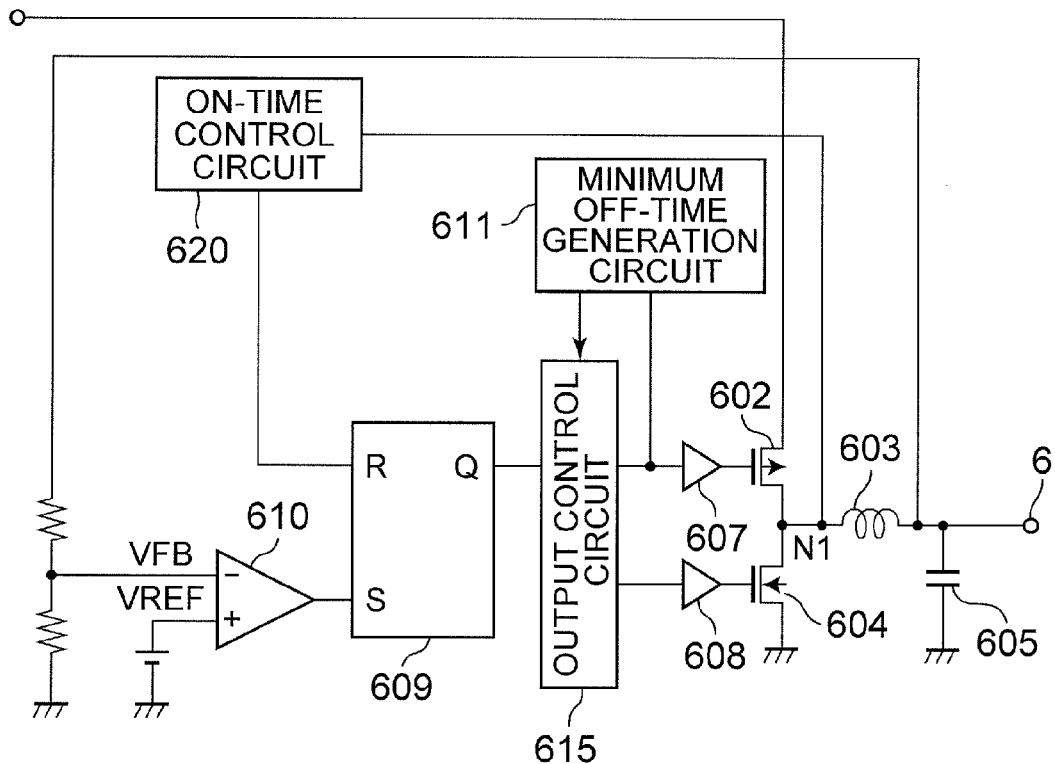
FIG. 6 is a circuit diagram illustrating the configuration of a related art switching regulator.
Figure 7:
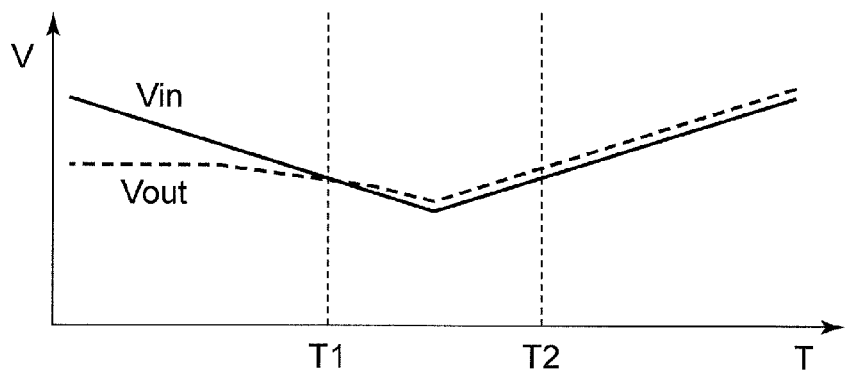
FIG. 7 is a timing chart illustrating a relation between a power supply voltage and an output voltage at a light load of the related art switching regulator.

FIG. 5 is a timing chart illustrating a relation between a power supply voltage and an output voltage at a light load of the switching regulator according to the present embodiment.

With the configuration of the switching regulator of the present invention, as described above, even though the light load is connected to the output terminal and the state of the power supply voltage Vin<the output voltage Vout is brought, the switching regulator can be returned to the normal state of the power supply voltage Vin>the output voltage Vout because the off-time is provided in the PMOS transistor 2. Therefore, it is possible to prevent the output voltage Vout from being raised with a rise in the power supply voltage Vin and a connecting device from being destroyed, thus making it possible to provide a switching regulator having high safety.

Incidentally, although the PMOS transistor has been described as the high-side switching element by way of example in the switching regulator of the present invention, a similar effect is obtained even though the high-side switching element is an NMOS transistor or an NPN or PNP bipolar transistor.

Further, the low-side switching element is also similar even in the case of being other elements such as a bipolar transistor, a diode, etc.

What is claimed is:

1. A switching regulator comprising:
   a high-side switching element connected to a power supply terminal and that outputs an intermittent output signal, based on a control signal input to a gate thereof;
   a smoothing circuit that outputs an output voltage obtained by smoothing the intermittent output signal to an output terminal;
   an error comparator that monitors the output voltage;
   an on-time control circuit that monitors the intermittent output signal and outputs a signal controlling an on-time of the high-side switching element;
   a flip-flop circuit that generates a signal based on a signal of the error comparator and the signal of the on-time control circuit;
   an output control circuit that generates the control signal, based on the signal from the flip-flop circuit; and
   a 100% DUTY detection circuit connected to the gate of the high-side switching element at an input terminal thereof and that detects a 100% DUTY at which the high-side switching element continues an on state for a prescribed time or more and outputs a detected signal at an output terminal to the output control circuit,
   wherein, when the output control circuit receives the detected signal therein, the output control circuit outputs the control signal turning off the high-side switching element.

2. The switching regulator according to claim 1, wherein the 100% DUTY detection circuit monitors the control signal to detect the 100% DUTY.

3. The switching regulator according to claim 2, further comprising a minimum off-time generation circuit that, upon detecting an off state of the high-side switching element, outputs a signal for maintaining the off state for a prescribed time to the output control circuit.

4. The switching regulator according to claim 1, further comprising a minimum off-time generation circuit that, upon detecting an off state of the high-side switching element, outputs a signal for maintaining the off state for a prescribed time to the output control circuit.

5. The switching regulator according to claim 1, wherein 100% DUTY detection circuit comprises:
- an input transistor connected to the input terminal;
- an output transistor connected to the output terminal; and
- a capacitor connected to the input transistor and to the output transistor.

* * * * *